Nov. 15, 1955   S. D. POOL ET AL   2,723,669
COMBINATION STALK CHOPPER AND LEAF STRIPPER
Filed Nov. 21, 1951   2 Sheets-Sheet 2
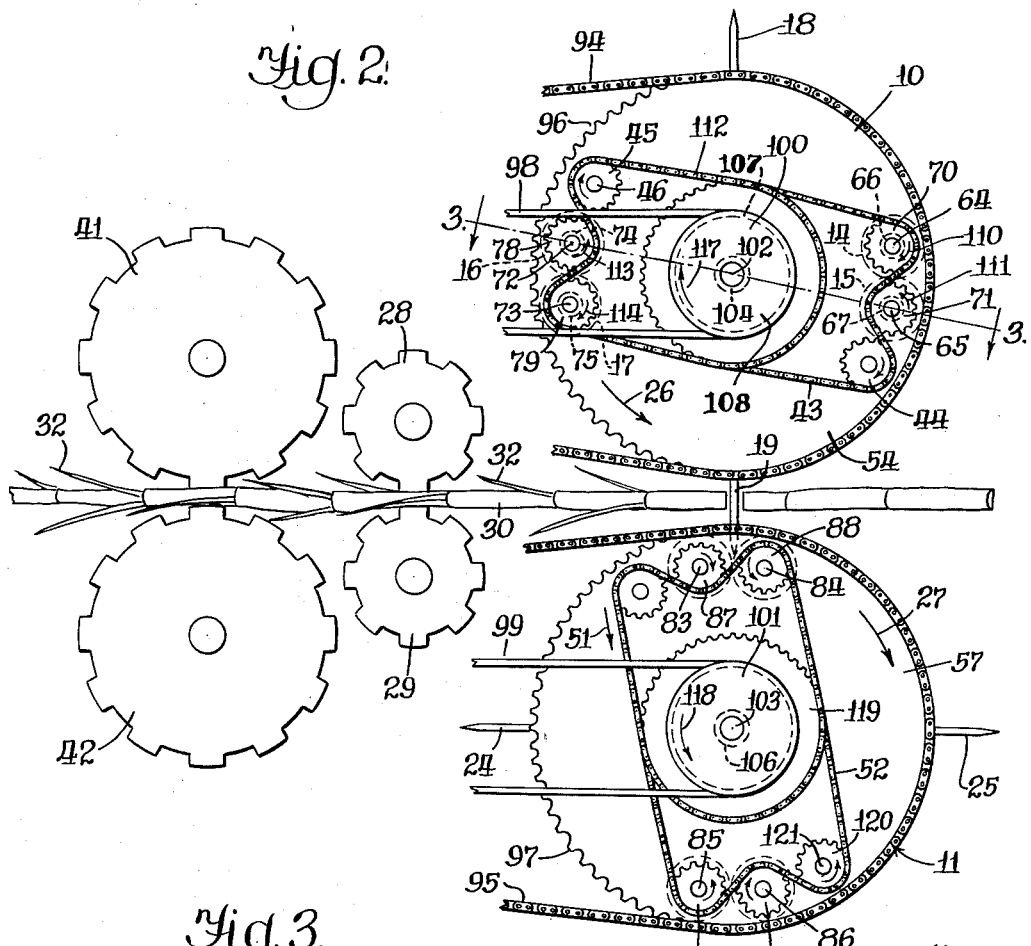
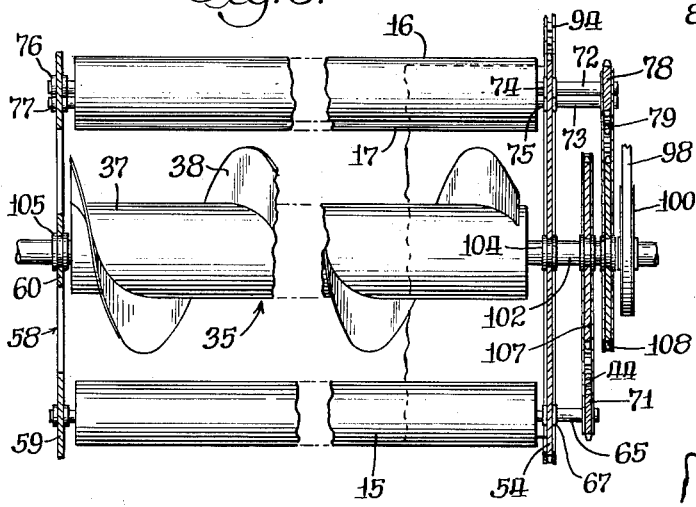
Inventors:
Stuart D. Pool
Elof K. Karlsson United States Patent Office 2,723,669
Patented Nov. 15, 1955

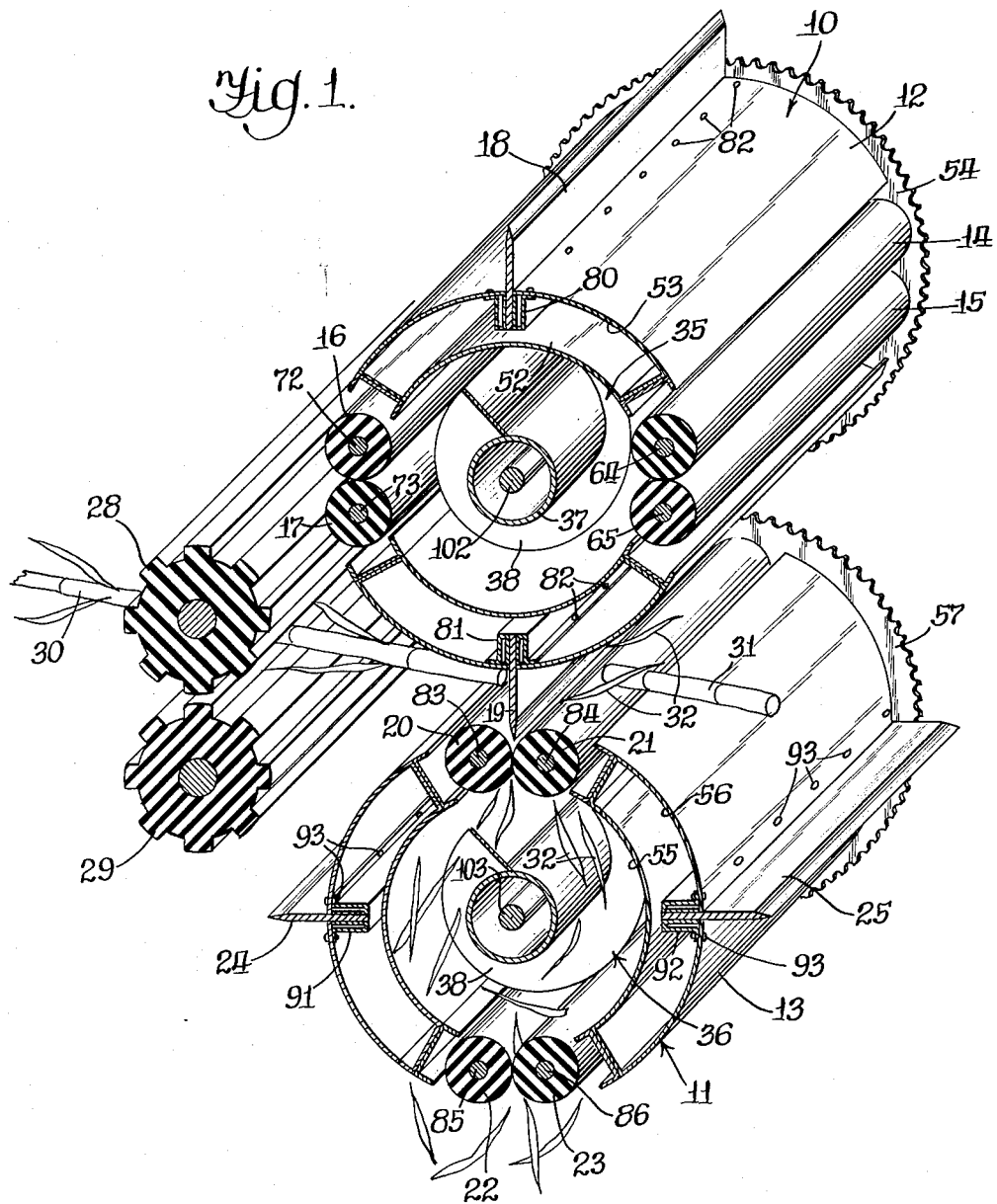

2,723,669

COMBINATION STALK CHOPPER AND LEAF STRIPPER

Stuart D. Pool and Elof K. Karlsson, Moline, Ill., assignors to International Harvester Company, a corporation of New Jersey Application November 21, 1951, Serial No. 257,514

11 Claims. (Cl. 130—31)

This invention relates to a new and improved combination stalk chopper and leaf stripper.

The combination stalk chopper and leaf stripper of this invention has been designed primarily for use with sugar cane. Sugar cane is a plant with relatively large tall stalks having a leafy foliage thereon. The sugar content of the plant is carried in the stalks, the largest percentage of sugar being in the lower ends thereof. It is the ultimate goal in cane harvesting machines to cut the cane stalks relatively close to the ground and strip them of all their foliage. Cane so delivered to sugar mills brings the highest price. One of the first operations on the cane stalks in the mills is to cut the stalks into short lengths, whereafter the sugar is removed by chemical and physical processes.

It is therefore an important object of this invention to provide a means which will cut the cane stalks into short lengths and simultaneously strip all leaves and foliage therefrom.

An important object of this invention is the provision of a combination stalk chopper and leaf stripper which may be used as an integral part of a cane harvester or which may be used as a stationary unit after the stalks have been previously harvested.

Another important object of this invention is to supply a stalk chopper and leaf stripper for plants of the stalk type wherein the stalks are cut into relatively short lengths and simultaneously with the cutting thereof the leaf material is removed.

Still another important object of this invention is to provide combination stalk chopper and leaf stripping mechanism wherein when the stalks are fed longitudinally therethrough, they will be cut into uniform short lengths and the leaf material conveyed laterally from the end of the mechanism.

Another and further important object of this invention is to provide cooperative rotor members having cooperative rolls journaled in the peripheral surface of each of said rotor members and having radially extending knife members in the peripheral surface thereof and rotating in such timed relationship that the radially extending knife of one rotor member will engage centrally of the cooperative rolls of the cooperative rotor member.

When stalks are passed through the juncture between the cooperative rotor members, the radially extending knives act to cut the stalk into short lengths and to simultaneously push the leaf material into the juncture between the cooperative rolls in the rotor members, with the result that the stalk is cleanly stripped of all its foliage.

Another important object of this invention is the provision of cooperative rotor members for effecting stalk chopping and leaf stripping and having auger conveyors mounted therein for the purpose of transversely feeding the discharged leaf material laterally to one side of the mechanism.

Other and further important objects of this invention will become apparent from the disclosures in the following specification and accompanying drawings.

In the drawings:

Fig. 1 is a perspective view partially in section showing the combination stalk chopper and leaf stripping mechanism of this invention.

Fig. 2 is a side elevational view of the mechanism as shown in Fig. 1.

Fig. 3 is a sectional view taken on the line 3—3 of Fig. 2.

Fig. 4 is an end view detail of the device of Fig. 3.

As shown in the drawings:

Reference numeral 10 indicates generally a rotor member which cooperates with a closely adjacent rotor member 11 to form the combination stalk chopper and leaf stripper of this invention. The cooperative rotor members 10 and 11 are provided with cylindrical shell housing members 12 and 13. The cylindrically shaped housing 12 comprises two concentrically spaced arcuate portions 52 and 53. An end wall disc 54 joins the sleeve like portions 52 and 53 and maintains them in fixed, spaced apart relationship. The sections 52 and 53 are fixedly fastened to the disc 54 as by welding or the like. The housing 13 is similarly constructed and includes concentrically spaced arcuate sleeve parts 55 and 56 and an end disc 57 which maintains the parts 55 and 56 properly spaced.

The rotor member 10 is equipped with a plurality of sets of cooperative roll members, one set of which has its rolls designated as 14 and 15. The sets of rolls are disposed in the peripheral surface of the cylindrical housing 12. The roll members 14 and 15 are carried by the disc 54 and a laterally spaced apart disc 58 forming the other end of the rotor 10. The disc 58, as best shown in Fig. 4, includes an outer annular rim 59, a center hub 60, and a spider 61 consisting of spaced spokes 62 radially disposed between the hub 60 and the outer rim 59. The spider 61 bridges the annular opening 63 in the disc 58 between the rim and hub. The rolls 14 and 15 are provided with reduced diameter shafts 64 and 65 respectively at the ends thereof which are journaled in bushings 66 and 67 in the disc 54 and in bushings 68 in the disc 58. The shafts 64 and 65 extend outwardly beyond their journal bushings 66 and 67 to receive sprockets 70 and 71. The rotor 10 is further provided with another set of cooperative rolls 16 and 17 which are similarly disposed for operation within the periphery of the cylindrical housing 12 and located directly opposite the rolls 14 and 15. Although the sets of rolls are diametrically opposed it should be understood that they may be spaced apart in any manner. The cooperative rolls 14 and 15 and 16 and 17 lie substantially within the surface of the cylindrical housing 12. The rolls 16 and 17 are mounted in the same manner as rolls 14 and 15. Small diameter central shafts 72 and 73 constitute the journalling and driving parts of the rolls 16 and 17 respectively. Bushings 74 and 75 receive and journal the shafts 72 and 73 in the disc 54 and similarly bushings 76 and 77 receive and journal the shafts 72 and 73 in the spaced apart disc 58. Sprockets 78 and 79 are mounted by keying or other fastening means on the extensions of the shafts 72 and 73 beyond the disc 54. Radially extending knives 18 and 19 are anchored in channel members 80 and 81 within the housing 12 in diametrically spaced apart position and at right angles to the cooperative rolls 14 and 15 and 16 and 17. The channel members 80 and 81 are fastened to the outer sleeve part 53 by means of rivets or the like 82. The knives 18 and 19, as shown in the drawings, extend outwardly considerably beyond the outer surface of the cylindrical housing 12 and thus are capable of extending across the gap between the cooperative rotor members 10 and 11. The diametrically opposed positioning of the rolls and knives is desirable but not necessary to the functioning of the device. It is preferable that the rolls and knives be alternately spaced about the periphery of the rotors.

The rotor 11 is constructed in the same manner as rotor 10 and is equipped with cooperative roll members 20 and 21 and 22 and 23. Knife members 24 and 25 are positioned in the cylindrical housing 13 and extend radially outwardly therefrom. The roll members 20 and 21 have reduced diameter center shafts 83 and 84 respectively and similarly the rolls 22 and 23 are equipped with end shafts 85 and 86 respectively. Sprockets 87, 88, 89, and 90 are fastened to the ends of the shafts 83, 84, 85, and 86 respectively. The knife members 24 and 25 as best shown in Fig. 1 are mounted in channel members 91 and 92 within the cylindrical surface of the rotor 11. The channel members 91 and 92 are fastened as by rivets 93 to the cylinder 13. The cooperative rotor members 10 and 11 are adapted to be rotatably driven in the directions indicated by the arrows 26 and 27. The drive means for the rotors 10 and 11 is accomplished by driven chains 94 and 95 respectively engaging sprockets 96 and 97 formed on the outer peripheral edges of the discs 54 and 57 respectively. The rotors 10 and 11 as previously stated are driven in the direction of the arrows 26 and 27.

Slotted or corrugated feed rolls 28 and 29 are disposed one above the other in the same manner as the rotor members 10 and 11 and are spaced forwardly therefrom and define a stalk feeding throat so that when cane stalks or stalks of other plants, such as corn or the like, are delivered thereto, the cooperative feeding rolls 28 and 29 act to propel the stalks designated by the numeral 30 into the juncture between the rotors 10 and 11. The rotors are timed in such a manner that the radially projecting knife between the rotor will meet the juncture between one of the pairs of cooperative rolls within the surface of the rotor to perform the dual function of shearing the stalk 30 as it passes therethrough into short lengths, as designated by the numeral 31, and pushing the green leaves or foliage 32 on the stalk downwardly into the area between the cooperative rolls, whereby the rolls act to pinch the leaf material and pull it downwardly therethrough and feed it centrally of the rotor members 10 and 11. As shown in Fig. 1, the knife member 19 of the rotor 10 is shown centrally disposed within the cooperative leaf stripping rolls 20 and 21 which are rotated inwardly and downwardly at their adjacent faces as indicated by the arrows 33 and 34. The driving means for the leaf removing rolls in the rotors 10 and 11 is received from V-belts 98 and 99 which impart their rotational drive to V-belt pulleys 100 and 101 on the rotors 10 and 11 respectively. The pulleys 100 and 101 are rotated in the direction of the arrows 117 and 118 respectively. The pulleys 100 and 101 are fastened to shafts 102 and 103 disposed centrally of the rotors 10 and 11. The shafts 102 and 103 are journaled in bushings 104 and 105, and 106 in the end discs 54 and 58, and 57 respectively. Also mounted on the shaft 102 are spaced sprockets 107 and 108 both of which are positioned inwardly of said V-belt pulley 100. A chain 43 passes around the sprocket 107 and the sprockets 70 and 71, all of which are in the same plane. An idler sprocket 44 is journally carried on the end disc 54 by means of a stub shaft 109. The idler sprocket 44 lies in the same plane with the sprockets 107 and 70 and 71 and contributes to the proper rotational direction being imparted to the rolls 14 and 15. The rolls 14 and 15 rotate inwardly toward each other as indicated by the arrows 110 and 111. Similarly an idler sprocket 45 lies in the plane with the sprockets 108, 78, and 79, and by means of a chain 112 the cooperative rolls 16 and 17 are driven inwardly toward each other in the same manner as rolls 14 and 15 and as indicated by the arrows 113 and 114. The idler sprocket is carried on a stub shaft 46 which is journaled on the disc 54.

Mounted centrally of each rotor 10 and 11 is an auger conveyor, 35 and 36, which is carried for rotation respectively on and with shafts 102 and 103. The auger conveyor 35 comprises a core 37 and a spirally wound flight 38 thereon. Similarly, the auger conveyor 36 includes a core member 39 and a spiral flight 40. The auger conveyors 35 and 36 are arranged and constructed to be rotatably driven by the driving of the shafts 102 and 103 by the V-belts 98 and 99. Thus, as the leaf material 32 of the cane stalks or the like is pulled centrally within the rotor members 10 and 11, the auger conveyors 35 and 36 will act to move the leaf material transversely of the line of travel of the stalks 30 and thereupon discharge the leaf material outwardly from the ends of the cooperative rotor members 10 and 11. This leaf material passes through the opening 63 in the end disc 58 as best shown in Fig. 3.

As best shown in Fig. 2, the cane stalks 30 are fed by means of slotted corrugated feed rollers 41 and 42 to the second pair of cooperative corrugated feed rollers 28 and 29 as shown in Fig. 1. Thereafter the rotor members 10 and 11 act to cut the stalk into short lengths 31 and to cause the leaf material 32 to discharge into the center of the cylindrical housings 12 and 13, respectively, of the rotor members 10 and 11. The auger conveyors 35 and 36 pick up the stripped leaf material and move it laterally out the end openings of the rotor members 10 and 11. The rotor unit 11 is provided with spaced sprockets on the shaft 103 comparable to the sprockets 107 and 108 on the shaft 102. Only one of these sprockets is shown in Fig. 2 and this is designated by numeral 119. A chain 48 is wrapped around the sprocket 119 and the sprockets 87 and 88 on the ends of the cooperative rolls 20 and 21. Here again, an auxiliary idler pulley 49 is carried on a stub shaft 50 which in turn is journally carried on the disc 57 of the rotor 11 in order that the chain 48 may travel in the direction indicated by the arrow 51 and still produce the inward and downward direction of the cooperative leaf stripping rolls 20 and 21. The sprockets 89 and 90 of the rolls 22 and 23 are driven by a chain 52 from a sprocket (not shown) behind the sprocket 119 on the shaft 103. An idler sprocket 120 is carried on a stub shaft 121 for journal mounting on the end disc 57 in the same manner as idler sprocket 88. The idler sprocket 120 lies in the same plane as the sprockets 89 and 90 and causes the chain 52 to rotate the rolls 22 and 23 inwardly toward each other to feed material centrally of the rotor 11 to the auger 36.

In the operation of the device of this invention, cane stalks are preferably disposed in a horizontal plane and feed longitudinally into the adjoining cooperative corrugated feed rolls 41 and 42 and 28 and 29. These feed rolls provide for the constant and uniform rate of travel of the stalks into the juncture between cooperative rotor members 10 and 11. By reason of the proper timing of the rotor units 10 and 11 with respect to each other, there is insured the interengagement of one of the knife elements 18 and 19 and 24 and 25 with an opposing pair of cooperative leaf stripping rolls. In the apparatus as shown in Fig. 2, the knife 19 projects downwardly through the space between the rotors 10 and 11 which is the path of travel of the cane stalks and thus causes the stalks 30 to be cut into short lengths 31. The leaf material 32 of the cane is relatively tough and leathery and is not susceptible to easy breakage. Therefore, the knife 19 causes the leaf material to be bent downwardly over the sharp edge of the knife without materially cutting through the foliage and thereupon delivering the foliage to the gripping action of the leaf stripping rolls 20 and 21. The leaf material designated by the numeral 32 is thus pulled free of the stalks 30 and delivered centrally of the rotor member 11, whereupon the rotating auger 36 delivers the waste foliage transversely of the apparatus. The rotor members 10 and 11 rotate in the direction of the arrows 26 and 27, respectively, and thereupon upon 90 degrees rotation of each of the rotors there will be present at the juncture of the rotors the knife blade 24 of the rotor 11 and the cooperative leaf stripping rolls 16 and 17 of the rotor 10. The same function will be performed on the stalk except for the grasping of the leaf material by the cooperative rolls 16 and 17 of the upper rotor 10. It will thus be apparent that alternately upon 90-degree rotation of the rotors 10 and 11 one rotor will cause cutting of the stalk into short lengths and delivery of the leaf material to leaf stripping rolls of the opposing rotor. Therefore, the auger conveyors 35 and 36 are alternately used to rid the apparatus of the leaf trash. The resultant clean short length sections of cane stalks are very convenient for transport to a sugar mill and conveniently treated for removal of the sugar therefrom without preliminary cutting of the full length stalks.

Numerous details of construction may be varied throughout a wide range without departing from the principles disclosed herein, and we therefore do not propose limiting the patent granted hereon otherwise than as necessitated by the appended claims.

What is claimed is:

1. A combination stalk chopper and leaf stripper comprising a pair of cooperative adjacent rotor members, each of said rotor members having a cylindrically shaped housing, diametrically opposed cooperative leaf stripping rolls journaled for rotation on and extending longitudinally of said housing, means rotating said rolls inwardly along their adjoining surfaces and directed toward the axial center of said rotor member, and radially extending knife members mounted on and extending longitudinally of said housing in diametrically opposed positions and at right angles to said leaf stripping rolls, means arranged and constructed to rotate said rotor members in opposite directions to each other and in timed relationship so that the knife members of one rotor member will engage centrally of the cooperative leaf stripping rolls of the other rotor.

2. A device as set forth in claim 1 in which auger conveyor means are provided centrally of each of said rotor members.

3. A stalk chopper and leaf stripper comprising a pair of parallel disposed driven rotors, said rotors having their peripheral surfaces in close proximity one to the other for feeding of stalk and leaf material therebetween, radially extending knife elements and sets of cooperative, surface engaging, parallel driven rolls alternately spaced about the circumference of and extending longitudinally of each of said rotors, and means rotating said rotors in timed relationship one to the other wherein one radially extending knife element of one rotor engages centrally of one of the sets of cooperative, surface engaging driven rolls of the other rotor whereby when stalks with leaves thereon are delivered to the juncture between the rotors the stalk is cut and the leaves stripped therefrom.

4. A device as set forth in claim 3 in which the cooperative driven rotors are rotated in opposite directions.

5. A device as set forth in claim 3 in which means is provided for rotating each of the sets of cooperative driven rolls in opposite directions to cause an inward pulling between the rolls toward the centers of the rotors.

6. A device as set forth in claim 3 in which a rotatably driven auger conveyor is journaled centrally and longitudinally within each of said cooperative driven rotors whereby leaf material delivered centrally of the rotors by the cooperative driven rolls will be conveyed longitudinally of and by said auger conveyors.

7. A device as set forth in claim 3 in which each of said cooperative driven rotors includes diametrically opposed radially extending knife elements and diametrically opposed sets of cooperative driven rolls, and each radially extending knife element and each set of cooperative driven rolls are disposed 90° apart on the cooperative driven rotors.

8. A stalk chopper and leaf stripper comprising a pair of rotors disposed parallel one to the other, said rotors adapted to feed stalk and leaf material therebetween, each of said pair of rotors including spaced apart end discs, a cylindrical shell housing between the spaced end discs, radially disposed knives spaced at intervals around the circumference of the cylindrical shell housing and extending longitudinally thereof, and surface engaging, parallel feed rolls journaled in said end discs and spaced at intervals in and around the circumference of the cylindrical shell housing.

9. A device as set forth in claim 8, in which each rotor further includes a driven auger conveyor positioned centrally and longitudinally thereof and adapted to receive leaf material from the cooperative rolls and deliver it endwise out of said rotor.

10. A combination stalk chopper and leaf stripper comprising a pair of cooperative adjacent rotor members, each of said rotor members having a cylindrically shaped sleeve housing, sets of cooperative leaf stripping rolls journaled for rotation on and longitudinally of said housing, means rotating said rolls inwardly along their adjoining surfaces and directed toward the axial center of said rotor member, and radial knife members mounted longitudinally on said housing in alternately spaced positions to said leaf stripping rolls, means rotating said rotor members in opposite directions to each other and in timed relationship so that the radial knife members of one rotor member will engage centrally of the cooperative leaf stripping rolls of the other rotor.

11. A combination stalk chopper and leaf stripper comprising a pair of cooperative adjacent rotor members, a pair of cooperative leaf stripping rolls journaled for rotation on one of said rotor members with the roll axes disposed parallel to the rotor member axis, means rotating said rolls inwardly along their adjoining surfaces and directed toward the axial center of said rotor member, a knife member mounted on the other of said rotor members and projecting radially outwardly, said knife member disposed parallel to the rotor member axis, and means rotating said rotor members in timed relationship whereby the knife member of the one rotor member will engage centrally of the cooperative rolls on the other rotor member.

References Cited in the file of this patent

UNITED STATES PATENTS

| | | |
|---|---|---|
| 360,045 | Porter | Mar. 29, 1887 |
| 434,773 | Erickson | Aug. 19, 1890 |
| 1,301,449 | Jolitz | Apr. 22, 1919 |
| 2,443,031 | Gerber | June 8, 1948 |
| 2,479,961 | Paul | Aug. 23, 1949 |
| 2,519,304 | Whitley | Aug. 15, 1950 |
| 2,527,303 | Gaddie | Oct. 24, 1950 |